(12) United States Patent
Segura

(10) Patent No.: US 8,171,715 B2
(45) Date of Patent: May 8, 2012

(54) SHACKLE APPARATUS

(75) Inventor: Victor J. Segura, New Iberia, LA (US)

(73) Assignee: Useful Products, L.L.C., New Iberia, LA (US)

(*) Notice: Subject to any disclaimer, the term of this patent is extended or adjusted under 35 U.S.C. 154(b) by 0 days.

(21) Appl. No.: 13/189,443

(22) Filed: Jul. 22, 2011

(65) Prior Publication Data

US 2011/0265442 A1    Nov. 3, 2011

Related U.S. Application Data

(63) Continuation-in-part of application No. 12/952,445, filed on Nov. 23, 2010, now Pat. No. 7,997,056, which is a continuation of application No. 12/802,901, filed on Jun. 16, 2010.

(60) Provisional application No. 61/296,958, filed on Jan. 21, 2010.

(51) Int. Cl.
  *F16G 15/06* (2006.01)
  *B66C 1/34* (2006.01)
(52) U.S. Cl. .................... 59/86; 59/78; 59/85
(58) Field of Classification Search ............ 59/78, 82, 59/85, 86
See application file for complete search history.

(56) References Cited

U.S. PATENT DOCUMENTS

| | | |
|---|---|---|
| 285,962 A | 10/1883 | Bracken |
| 962,733 A | 6/1910 | Beltz |
| 1,222,997 A | 4/1917 | Rottmer |
| 1,273,689 A | 7/1918 | Thomas |
| 1,751,309 A | 3/1930 | De Mone |
| 3,482,862 A | 12/1969 | Maloney |
| 3,962,811 A | 6/1976 | Buschini et al. |
| 4,079,584 A | 3/1978 | Shahan |
| 4,102,124 A | 7/1978 | Swager |
| 4,134,255 A | 1/1979 | McBain et al. |
| 4,145,874 A | 3/1979 | Muller |
| 4,221,252 A | 9/1980 | Bruce |
| 4,249,474 A | 2/1981 | Archer |
| 4,337,614 A | 7/1982 | Briscoe |

(Continued)

FOREIGN PATENT DOCUMENTS

EP    251279 A2    1/1988

(Continued)

OTHER PUBLICATIONS

New Zealand Scaffolding Best Practices; http://www.osh.dol.govt.nz/publications/booklets/scaffolding-09/scaffolding_08.asp; Company: New Zealand Department of Labour; Author is believed to be Scaffolding & Rigging New Zealand Incorporated; Publication date is unknown but accessed in a prior art search on Oct. 20, 2010.

(Continued)

*Primary Examiner* — David Jones
(74) *Attorney, Agent, or Firm* — Russel O. Primeaux; Kean Miller LLP

(57) ABSTRACT

A shackle apparatus including a generally U-shaped shackle body having an arcuate end, a pair of parallel arms, and a retaining member spanning a gap defined between the shackle arms. The retaining member cooperates with the shackle body to define a closed loop which can be permanently attached to a sling or lifting cable. The retaining member prevents the shackle apparatus from being removed and installed on another sling or lifting cable without substantially destroying the shackle apparatus of the present invention.

20 Claims, 13 Drawing Sheets

U.S. PATENT DOCUMENTS

| | | | |
|---|---|---|---|
| 4,565,399 | A | 1/1986 | Cranston |
| 4,684,280 | A | 8/1987 | Dirkin |
| 4,896,989 | A | 1/1990 | Swager |
| 4,914,903 | A | 4/1990 | Bernt |
| 5,046,881 | A | 9/1991 | Swager |
| 5,103,755 | A | 4/1992 | Garrett |
| 5,429,007 | A | 7/1995 | Khachaturian et al. |
| 5,433,547 | A | 7/1995 | Hart |
| 5,452,679 | A | 9/1995 | Eckley |
| 5,466,082 | A | 11/1995 | Sherar |
| 5,589,646 | A | 12/1996 | Khachaturian et al. |
| 5,865,557 | A | 2/1999 | Kasim |
| 5,890,270 | A | 4/1999 | Oetiker |
| 5,975,786 | A | 11/1999 | Chang |
| 6,023,927 | A | 2/2000 | Epstein |
| 6,282,879 | B1 | 9/2001 | Bonaiti et al. |
| 6,568,894 | B2 | 5/2003 | Golden |
| 6,774,320 | B2 | 8/2004 | Simons |
| 7,448,823 | B2 | 11/2008 | Silva |
| 7,540,140 | B1 | 6/2009 | Diaz |
| 7,614,209 | B1 | 11/2009 | Payne et al. |
| 7,654,594 | B2 | 2/2010 | Bisso, IV |
| 7,997,056 | B2 * | 8/2011 | Segura ............... 59/86 |
| 2009/0196683 | A1 | 8/2009 | Lunn et al. |

FOREIGN PATENT DOCUMENTS

GB        1452358 A1      10/1976

OTHER PUBLICATIONS

A. Noble & Son Shackle; http://nobles.com.au/products.aspx?doc_id=1264; Company and Author believed to be A. Noble & Son Ltd.; publication date is unknown, but accessed in a prior art search on Oct. 20, 2010.

Halyard Shackle; http://www.bosunsupplies.com/products2.cfm?product=S0164; Company and Author: Bosun Supplies, Inc.; Publication date believed to be Jun. 11, 2001.

Seafit RFID Shackle; http://www.offshore-mag.com/index/article-display/3125382309/articles/offshore/volume-70/Issue_6/equipment-_engineering/Heavy_lift_shackle_design_offers_new_benefits.html; Company: Penn Well; Author believed to be Offshore magazine; publication believed to be Jun. 1, 2010.

Wichard Shackle; http://www.yachtmailchandlery.com/wichard-stainless-key-pin-shackles-p-403.html; Company and Author: Yachtmail Chandlery; publicationdate is unknown, but accessed in a prior art search on Oct. 20, 2010.

Sea-Fit RFID Shackle; http://www.sea-fit.com/featured/1277850327.pdf; Company and Author believed to be Sea-Fit, Inc.; publication date is unknown but accessed in a prior art search on Oct. 20, 2010.

* cited by examiner

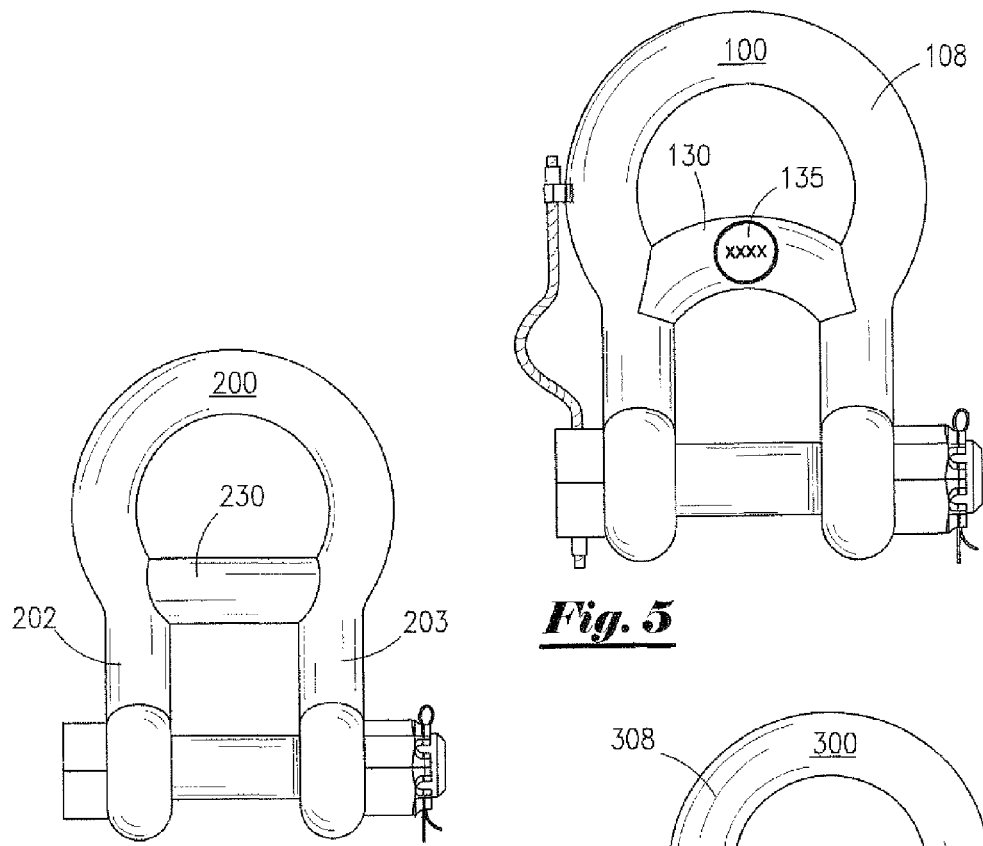
*Fig. 5*
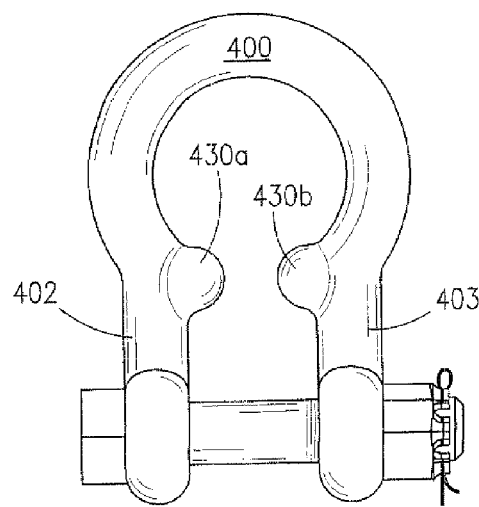
*Fig. 6*
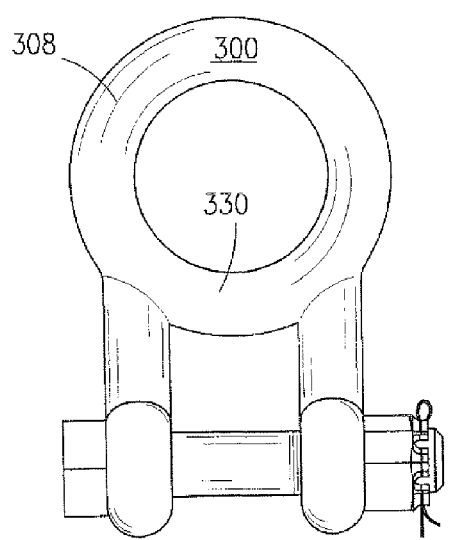
*Fig. 7*
*Fig. 8*

SHACKLE APPARATUS

CROSS REFERENCES TO RELATED APPLICATION

Priority of U.S. Non-Provisional application Ser. No. 12/952,445, filed Nov. 23, 2010, which is a Continuation of Non-Provisional application Ser. No. 12/802,901, filed Jun. 16, 2010, and Provisional Patent Application Ser. No. 61/296,958 filed Jan. 21, 2010, incorporated herein by reference, is hereby claimed.

STATEMENTS AS TO THE RIGHTS TO THE INVENTION MADE UNDER FEDERALLY SPONSORED RESEARCH AND DEVELOPMENT

None

BACKGROUND

1. Field

The present invention relates generally to an assembly for connecting a sling, cable, or other lifting device to a load to be lifted. More particularly, the present invention relates to a shackle apparatus that is permanently attached to a set of slings, lifting cables or the like. More particularly still, the present invention relates to a captivated shackle apparatus that must also be discarded when attached slings or lifting cables are discarded. In an alternative embodiment, the shackle apparatus is adapted such that it comprises a retaining means to resist removal of a bolt. In yet another alternative embodiment, the shackle apparatus is adapted such that is comprises a retaining means to resist removal of a nut. In a further embodiment, the shackle apparatus comprises a retaining means to resist removal of both a bolt and a nut.

2. Brief Description of the Prior Art

Numerous devices have been devised for the purpose of lifting baskets, skids and/or similar equipment, especially in connection with the transportation of said baskets, skids and/or equipment from one location (such as, for example, the deck of a boat) to another location (such as, for example, an offshore platform) using a crane, hoist or other lifting means. In the course of such lifting operations, consideration must be given to maintaining control of a load during the lifting process. Consideration must also be given to other factors, such as ease in making connections and disconnections to such load, as well as the protection or preservation of the load being transported. Perhaps more significantly, consideration must also be given to minimizing possible failure locations on the item(s) being lifted, as well as the related lift equipment, in order to prevent damage to property or personnel.

During lifting operations, large or heavy loads are typically lifted using a set of slings connected to the line of a crane, or hoist or other lifting apparatus. Although it is often possible to connect a crane or hoist line directly to a load to be lifted using shackles or the like, slings generally provide an intermediate means to quickly and efficiently connect a lifting device to a load. Further, because many slings utilize two or more separate lines connected to a central link or loop, slings are generally preferred because they allow for more even weight distribution during the lifting process.

The use of slings to lift and/or transport equipment, cargo or other loads is very common in offshore or marine operations, as well as numerous other applications, such as the loading and unloading of ships and other vessels. It should be noted that the offshore oil and gas industry, although representative of the issues faced in the lifting and transportation of heavy loads, is but one application involving such issues.

The use of lifting slings or cables as an intermediary link for connecting a load to a lifting device (such as a crane hook or the like) is well known. In conventional lifting applications, a lifting sling normally has a plurality of cable legs of substantially equal length, which are joined together at their upper ends and are coupled to a common, master connection assembly. In most instances, said master connection assembly is a loop dimensioned so that it can easily connect to a crane hook. Each cable leg of the sling is normally fitted with a looped terminal end which is formed using a mechanical joint or crimped band.

In many instances, shackles or other means can be used to connect the individual lines of a set of slings to pad-eyes of a load to be lifted. Specifically, a shackle or clevis is commonly used to connect each looped end of a sling or lifting cable to a load to be lifted. In conventional lifting applications utilizing existing shackle assemblies, a substantially U-shaped shackle having a mouth or opening is passed through the loop or eye of a sling or lifting cable. Thereafter, a bolt is threaded through aligned bores in said shackle and an opening in a lift lug or pad eye of a load to be lifted. In this manner, the shackle provides a quick and efficient means for affixing a sling, cable, or other lifting device to a load to be lifted.

Safety regulations and customary safety procedures often dictate that lifting slings or cables be discarded after a predetermined threshold is met, such as a certain period of time or number of lifts. Despite such safety regulations and/or procedures, it has been observed that shackles are often removed from such lifting slings or cables prior to discarding of the slings or cables. The removal of shackles from such slings and re-use of such shackles on other slings or lifting cables defeats the purpose of the aforementioned safety practices. As such, it would be beneficial to provide a captivated shackle apparatus permanently attached to a set of lifting slings or cables that must be discarded along with such attached slings or lifting cables in order to ensure that such shackles are not re-installed or re-used on other slings or lifting cables.

SUMMARY

The present invention comprises a shackle apparatus having a generally U-shaped shackle body having an arcuate end, a pair of substantially parallel arms, and a retaining member disposed between said shackle arms. Each arm has a lower end with a transverse bore for receiving a bolt or other rigid member, the lower ends being substantially parallel such that the transverse bores are in general axial alignment.

The shackle apparatus of the present invention is intended to be permanently attached to a sling of a lifting cable such that the retaining member prevents such shackle apparatus from being removed and installed on another sling or lifting cable without substantially damaging or destroying the shackle apparatus of the present invention, thereby rendering it effectively useless.

The shackle apparatus of the present invention can be affixed to a load to be lifted by passing a bolt or other rigid member through aligned bores in the shackle arms and through a complimentary hole in a pad eye or lift lug on the load to be lifted. In the preferred embodiment, said bolt includes an externally threaded portion and can be secured in place using a threaded-nut or other similar device.

In an alternative embodiment, the shackle apparatus comprises a retaining means which resists removal of a bolt once the bolt is inserted into the shackle bore.

In another embodiment, the shackle apparatus comprises a retaining means which resists removal of a nut once the nut is inserted into the shackle bore.

In yet another embodiment, the shackle apparatus comprises retaining means which resists removal of both a bolt and a nut once the bolt and nut are inserted into the shackle bores.

It is an object of the invention to provide a captivated shackle apparatus that is permanently attached to a lifting sling or cable.

It is a more particular object of the present invention to provide a shackle apparatus which cannot be removed from one lifting sling or cable and installed on another lifting sling or cable without substantially destroying the shackle apparatus of the present invention and rendering it useless.

It is a further object of the present invention to provide a shackle apparatus that must be discarded along with a lifting sling or cable after a predetermined threshold is satisfied such as, for example, length of time or number of lifts.

It is yet another object of the present invention to provide a shackle apparatus that retains the bolt within the shackle apparatus such that once inserted fully into the shackle apparatus, a bolt retaining mechanism resists removal of the bolt from the shackle apparatus.

It is another object of the present invention to provide a shackle apparatus that retains the nut within the shackle apparatus once the nut is fully inserted into the shackle apparatus, such that once nut is inserted into the shackle apparatus, a nut retaining mechanism resists removal of the nut from the shackle apparatus.

BRIEF DESCRIPTION OF THE DRAWINGS

The foregoing summary, as well as the following detailed description of the preferred embodiments, is better understood when read in conjunction with the appended drawings. For the purpose of illustrating the invention, the drawings show certain preferred embodiments. It is understood, however, that the invention is not limited to the specific methods and devices disclosed.

FIG. 5 depicts a front view of the shackle apparatus of the present invention.

FIG. 6 depicts a front view of a first alternative embodiment of the shackle apparatus of the present invention.

FIG. 7 depicts a front view of a second alternative embodiment of the shackle apparatus of the present invention.

FIG. 8 depicts a front view of a third alternative embodiment of the shackle apparatus of the present invention.

DETAILED DESCRIPTION

Figures 1, 2:
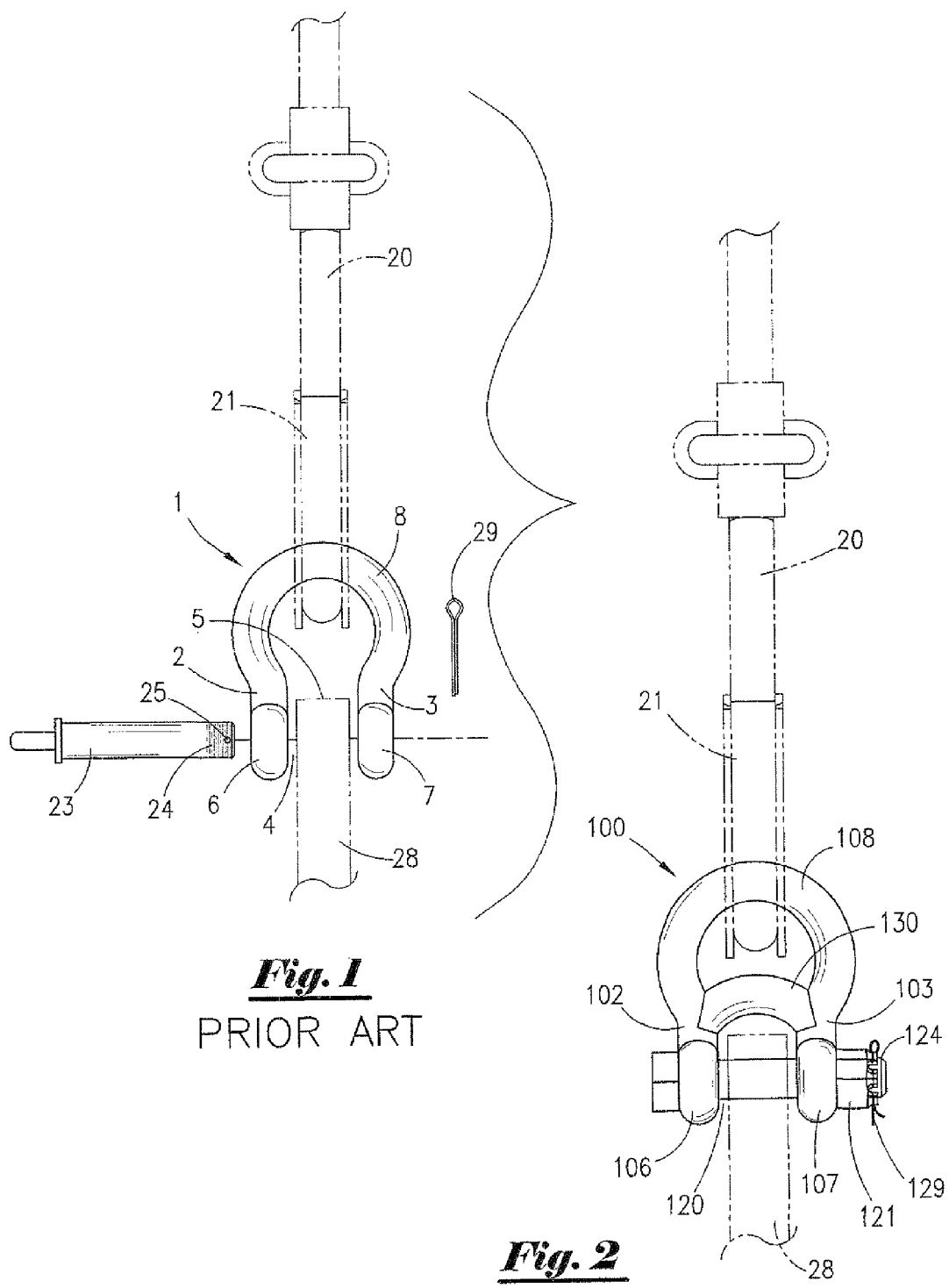
FIG. 1 depicts a partially exploded front view of a prior art shackle apparatus.
FIG. 2 depicts a front view of an embodiment the shackle apparatus of the present invention installed on a sling loop.

Referring now to the drawings, FIG. 1 depicts a partially-exploded front view of an embodiment of a conventional lifting assembly utilizing a prior art shackle member 1 having a curved, substantially U-shaped body section 8, first arm 2 and second arm 3. A throat or gap 5 is defined between said first arm 2 and second arm 3, and a mouth or opening 4 leads to said throat 5. Arms 2 and 3 of prior art shackle 1 also include substantially parallel ends 6 and 7 respectively. Substantially parallel ends 6 and 7 include aligned coaxial transverse bores 6a and 7a (not visible in FIG. 1), respectively, for receiving a bolt 23 or other rigid member.

In the conventional lifting assembly depicted in FIG. 1, mouth 4 of prior art shackle 1 is first passed through loop 21 of a sling or lifting cable 20. Coaxial transverse bores 6a and 7a of prior art shackle 1 are aligned with an opening (not visible in FIG. 1) in a lift lug or pad eye 28 of a load to be lifted. Bolt 23 is thereafter inserted through aligned coaxial bores 6a and 7a, as well as said opening (not visible in FIG. 1) in the lift lug 28 of the load to be lifted. In the embodiment depicted in FIG. 1, bolt 23 can be rotated so that external threads 24 present on said bolt 23 can engage with internal threads in transverse bore 7a extending through end 7 of arm 3. Thereafter, cotter pin 29 can be introduced through cotter pin hole 25 in bolt 23 and secured in place to prevent said bolt 23 from traveling axially with respect to aligned bores 6a and 7a (not visible in FIG. 1).

FIG. 2 depicts a front view of shackle apparatus 100 according to a preferred embodiment of the present invention. Shackle apparatus 100 has a substantially U-shaped shackle body section 108, and substantially parallel first arm 102 and second arm 103. A throat or gap is defined by the space between said first arm 102 and second arm 103. Retaining member 130 is disposed between said shackle arms 102 and 103. In the preferred embodiment, retaining member 130 is a rigid, integrated cross member disposed between first and second arms 102 and 103, such that retaining member 130 spans the throat or gap between said first and second arms. Retaining member 130 cooperates with shackle body 108 to effectively form a closed loop. In the preferred embodiment, said closed loop formed by cooperating elements shackle body 108 and retaining member 130 is permanently affixed to loop 21 of a sling or lifting cable 20.

In the preferred embodiment, first shackle arm 102 has lower end 106, while second shackle arm 103 has lower end 107. Shackle arms 102 and 103 are substantially parallel and are provided with aligned transverse bores 102a and 103a (not shown in FIG. 2), respectively, for axially receiving a bolt 120 or other rigid member. Specifically, bolt 120 is passed through aligned coaxial bores in arms 102 and 103 of shackle 100 (as well as an opening in lift lug 28) to affix shackle apparatus 100 to a load to be lifted. Bolt 120 preferably includes an externally threaded portion 124 and cotter pin hole 125 (not shown in FIG. 2) through which cotter pin 129 can be inserted and secured after a threaded fitting, such as a castle nut 121, is installed on externally threaded portion 124 of bolt 120.

Figure 4:
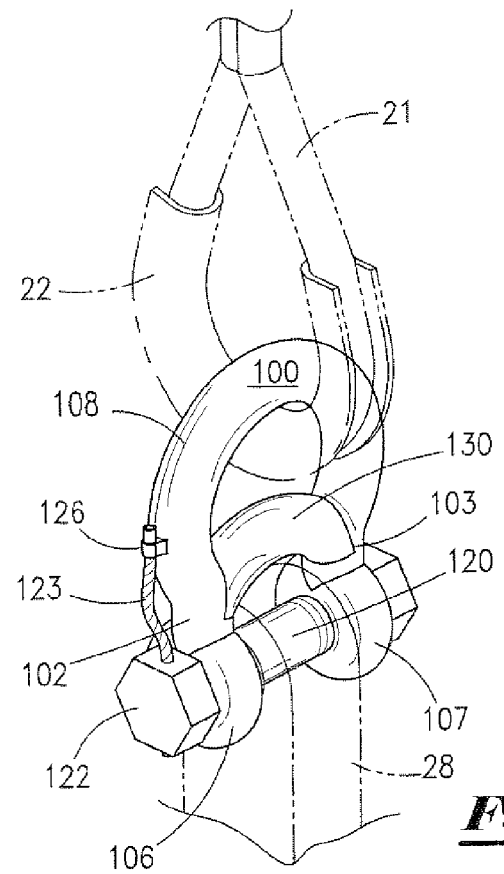
FIG. 4 depicts a front perspective view of the shackle apparatus of the present invention installed on a sling loop.

FIG. 4 depicts a front perspective view of shackle apparatus 100 of the present invention installed on sling loop 21 having reinforcing sleeve 22. Shackle apparatus 100 has a substantially U-shaped shackle body 108, first arm 102 and second arm 103 defining a gap between said first arm 102 and second arm 103.

Retaining member 130 is disposed between shackle arms 102 and 103. In the preferred embodiment, retaining member 130 is a rigid, integrated cross member disposed between the upper ends of first and second arms 102 and 103, respectively, such that retaining member 130 spans the space formed between said first and second arms 102 and 103 of shackle 100. Substantially U-shaped shackle body 108 and retaining member 130 cooperate to define a substantially closed loop that can be permanently affixed to loop 21 of a sling or lifting cable 20.

In the preferred embodiment, lower end 106 of shackle arm 102, and lower end 107 of shackle arm 103, are substantially parallel and are provided with aligned transverse bores (not shown in FIG. 4) for axially receiving a bolt 120 or other rigid member. Bolt 120 is passed through said aligned coaxial bores in lower end 106 of first arm 102, and lower end 107 of second arm 103 (as well as an aligned opening in lift lug 28) to affix shackle apparatus 100 to a load to be lifted. In the preferred embodiment, retaining cable 123 is provided. Said retaining cable is affixed at one end to head 122 of bolt 120, and at the other end to shackle body 108 using bracket 126. Retaining cable 123 beneficially prevents bolt 120 from being removed from shackle apparatus 100 and subsequently reused on another shackle with severing retaining cable 123.

Figure 3:
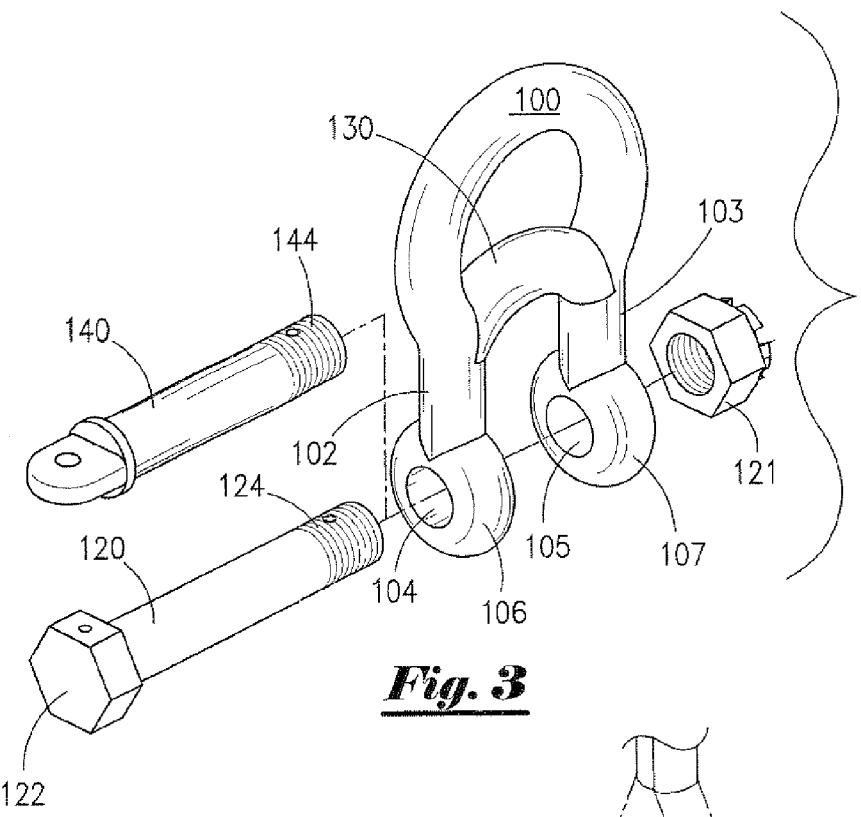
FIG. 3 depicts partially exploded perspective view of the shackle apparatus of the present invention.

FIG. 3 depicts an exploded perspective view of shackle apparatus 100 of the present invention having a substantially U-shaped shackle body 108, first arm 102 and second arm 103. A gap is defined between said first arm 102 and second arm 103. Retaining member 130 is disposed between shackle arms 102 and 103 and spans said gap between said arms.

In the preferred embodiment, retaining member 130 is a rigid, integrated, cross member disposed between first and second arms 102 and 103, respectively, such that retaining member 130 spans the gap formed between arms 102 and 103.

In the preferred embodiment, lower end 106 of shackle arm 102, and lower end 107 of shackle arm 103, are substantially parallel. Transverse bore 104 extends through said lower end 106 of shackle arm 102, while transverse bore 105 extends through lower end 107 of shackle arm 103. Transverse bores 104 and 105 are substantially aligned with one another.

Bolt 120 having head 122 and external threaded portion 124 is inserted through transverse bore 104, an aligned hole in a lifting lug or pad-eye of a load to be lifted (such as, for example, lift lug 28 depicted in FIG. 4), and transverse bore 105. Thereafter, castle nut 121 can be installed on, and threadably engaged with, threaded portion 124 of bolt 120 in order to secure said bolt 120 in place. Alternative bolt embodiment 140 is also depicted in FIG. 3. Alternative bolt embodiment 140 has external threaded portion 144, which can mate with optional threads disposed on the internal surface of transverse bore 107.

Shackle apparatus 100 depicted in FIG. 5 includes a curved retaining member 130 bowing in substantial alignment with the generally arcuate shape of shackle body 108. FIG. 6 depicts an alternative embodiment of shackle apparatus 200 having a substantially straight retaining member 230 disposed in substantially perpendicular orientation to shackle arms 202 and 203. The alternative embodiment of shackle apparatus 300 depicted in FIG. 7 includes a curved retaining member 330 that cooperates with substantially arcuate body section 308 to form a generally circular closed loop. In the alternative embodiment of shackle 400 depicted in FIG. 8, retaining member 430 comprises a pair of projections 430a and 430b. The reduced gap between retaining member projections 430a and 430b is less than the cross-sectional distance (thickness) of a sling loop (such as sling loop 21 depicted in FIG. 4, for example), such that said sling loop cannot pass through the space formed between arms 402 and 403.

In the preferred embodiment, shackle apparatus 100 and bolt 120 of the present invention are beneficially constructed of unitary pieces preferably produced by forging using a durable material and can be strengthened using conventional heat treating processes. In the preferred embodiment, the forged shackle apparatus 100 is permanently attached to the looped end of a sling or lifting cable 20.

Still referring to FIG. 5, apparatus 100 of the present invention can be permanently attached to a sling or lifting cable such that cooperation between the shackle body and retaining member 130 prevents shackle apparatus 100 from being removed and installed on another sling or lifting cable without substantially damaging or destroying shackle apparatus 100 of the present invention.

In the preferred embodiment, shackle apparatus 100 of the present invention may be beneficially provided with a radio frequency identification (RFID) chip or tag. A RFID tag incorporated into shackle apparatus 100 enables a user to monitor the conditions of a shackle apparatus 100 including, but not limited to, the identity, location and history of operation and use. Moreover, shackle apparatus 100 of the present invention may be beneficially provided with identifying indicia on the surface of the shackle body 108 or retaining member 130. Such identifying indicia may comprise much different information, but in the preferred embodiment would reflect significant information regarding the shackle apparatus including, without limitation, manufacturer, date of manufacture, owner, load rating/specifications and/or useable life.

Although a RFID can be incorporated into shackle apparatus 100 in many different ways, in the preferred embodiment depicted in FIG. 5, recess 135 is disposed on retaining member 130. A RFID chip can be installed in said recess 135, and secured in place using an adhesive, resin, epoxy or other material having desired properties.

Figure 10A:
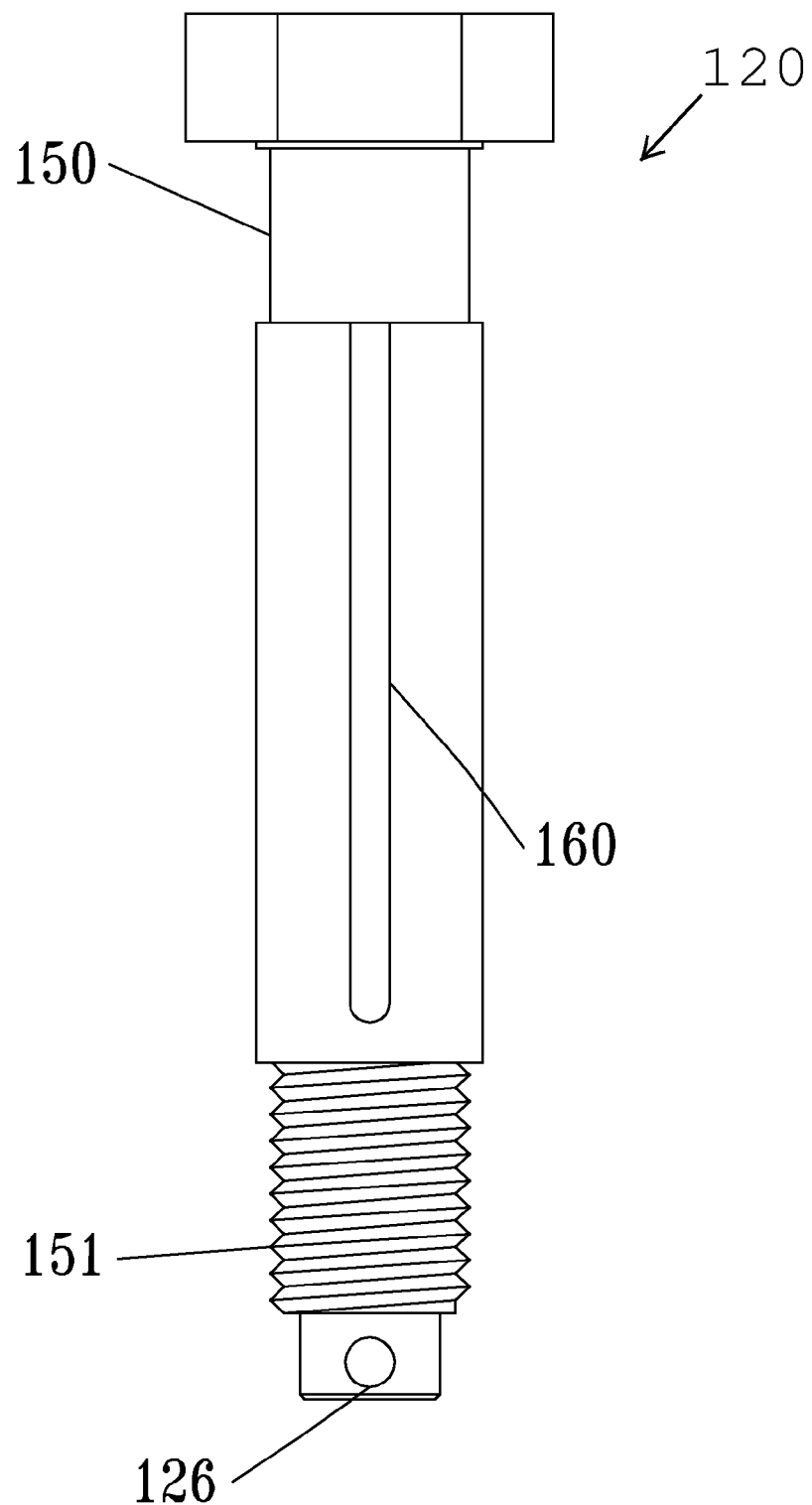
FIG. 10a depicts a side view of a bolt which may be used with an improved shackle apparatus.
Figure 10B:
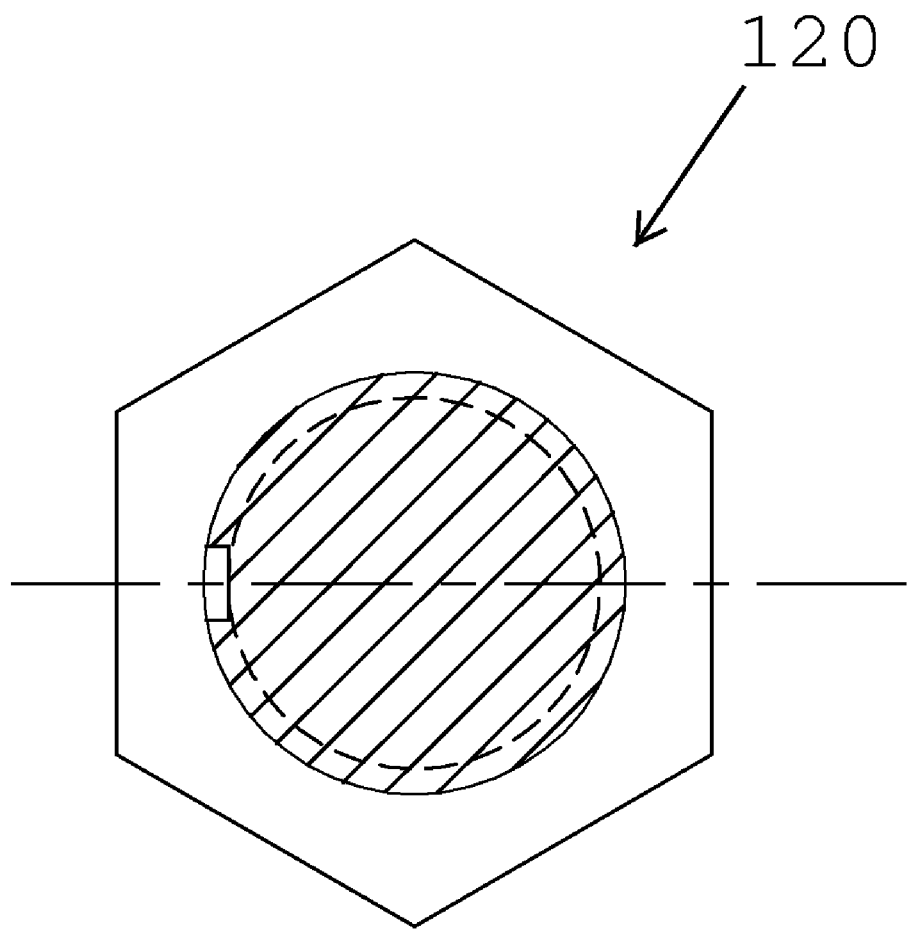
FIG. 10b depicts an end view of a bolt which may be used with an improved shackle apparatus.
Figure 11:
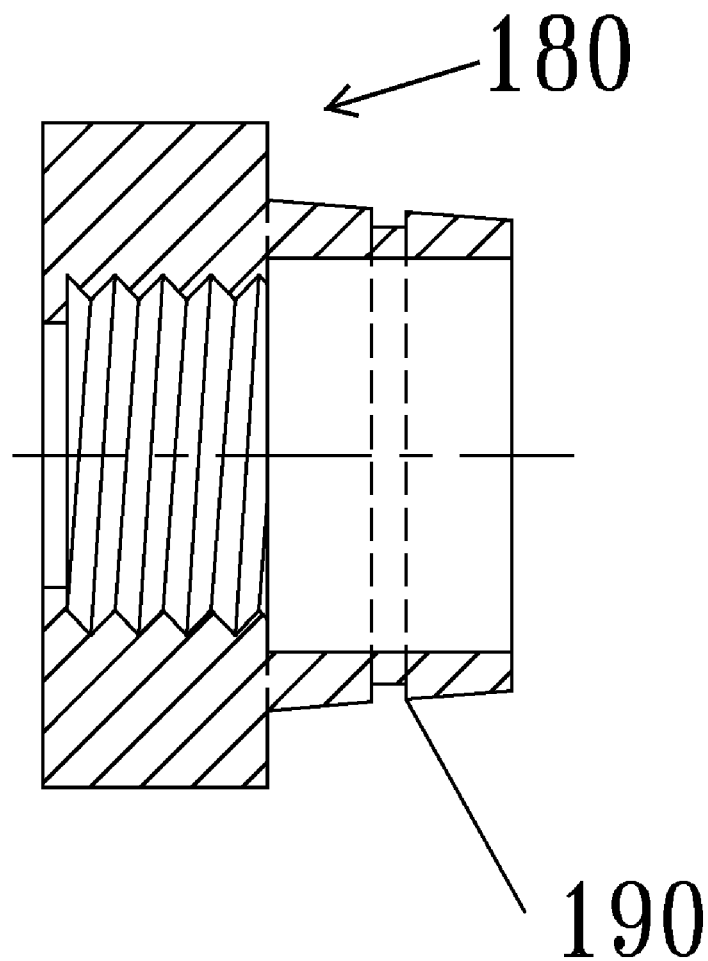
FIG. 11 depicts a side view of a nut which may be used with an improved shackle apparatus.
Figure 12:
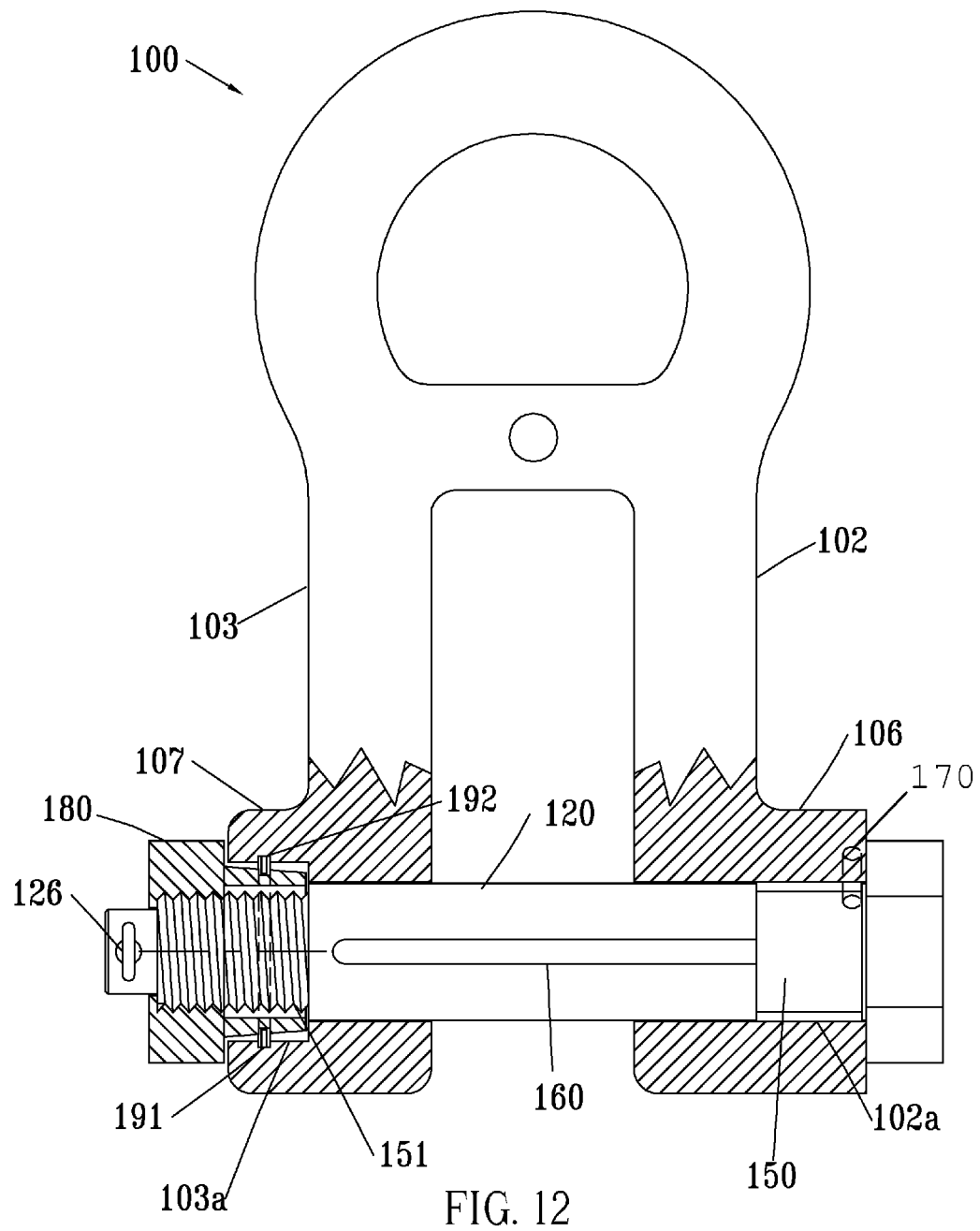
FIG. 12 depicts an improved shackle apparatus with a nut and bolt.

An improved shackle apparatus is depicted in FIG. 9-FIG. 13. FIG. 9a, 9d, and FIG. 12 depict a front view of shackle apparatus 100. In this alternate embodiment, the lower end 106 of first arm 102, is wider than the upper portion of the first arm 102. Additionally, the lower end 107 of second arm 103 is wider than the upper portion of the second arm 103. The lower ends of first and second arms are wider externally, so that the interior of the shackle has a substantially uniform distance between said first and second arms from the retaining member through the end of the shackle. Therefore the "shoulder" areas of lower ends 106 and 107 are located on the external surfaces of arms 102 and 103. Shackle apparatus 100 has a substantially U-shaped shackle body section, and first arm 102 and second arm 103 are substantially parallel. A throat or gap is defined by the space between said first arm 102 and second arm 103. Retaining member 130 is disposed between said shackle arms 102 and 103. In one embodiment, retaining member 130 is a rigid, integrated cross member disposed between first and second arms 102 and 103, such that retaining member 130 spans the throat or gap between said first and second arms. Retaining member may be substantially straight or curved, as described above. Retaining member 130 cooperates with the shackle body to effectively form a closed loop. In another embodiment, said closed loop formed by cooperating elements shackle body and retaining member 130 is permanently affixed to a loop of a sling or lifting cable.

Shackle arms 102 and 103 are substantially parallel and are provided with aligned transverse bores 102a and 103a, respectively, for axially receiving a bolt 120 or other rigid member. Specifically, bolt 120 is passed through aligned coaxial bores in shackle arms 102 and 103 of shackle 100. Transverse bore 103a has nut receiving section 193, as depicted in FIG. 9d, located proximate to the external side of second arm 103. Nut receiving section 193 has a diameter sized such that nut 180 may be received within nut receiving section 193. In one embodiment, the diameter of nut receiving section 193 has a diameter that is greater than that of the remainder of transverse bore 103a.

Figure 9A:
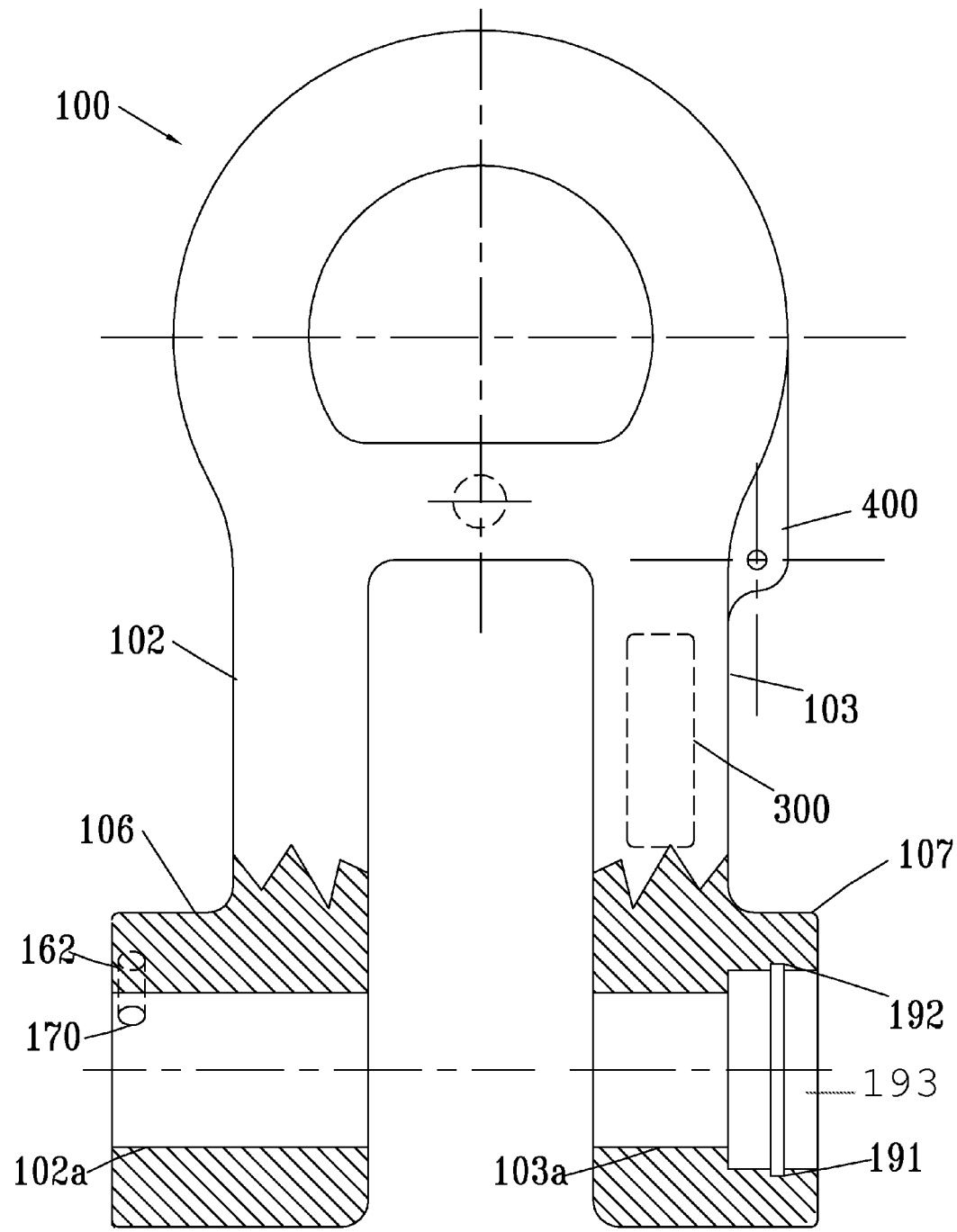
FIG. 9a depicts a front view of an improved shackle apparatus.
Figure 9B:
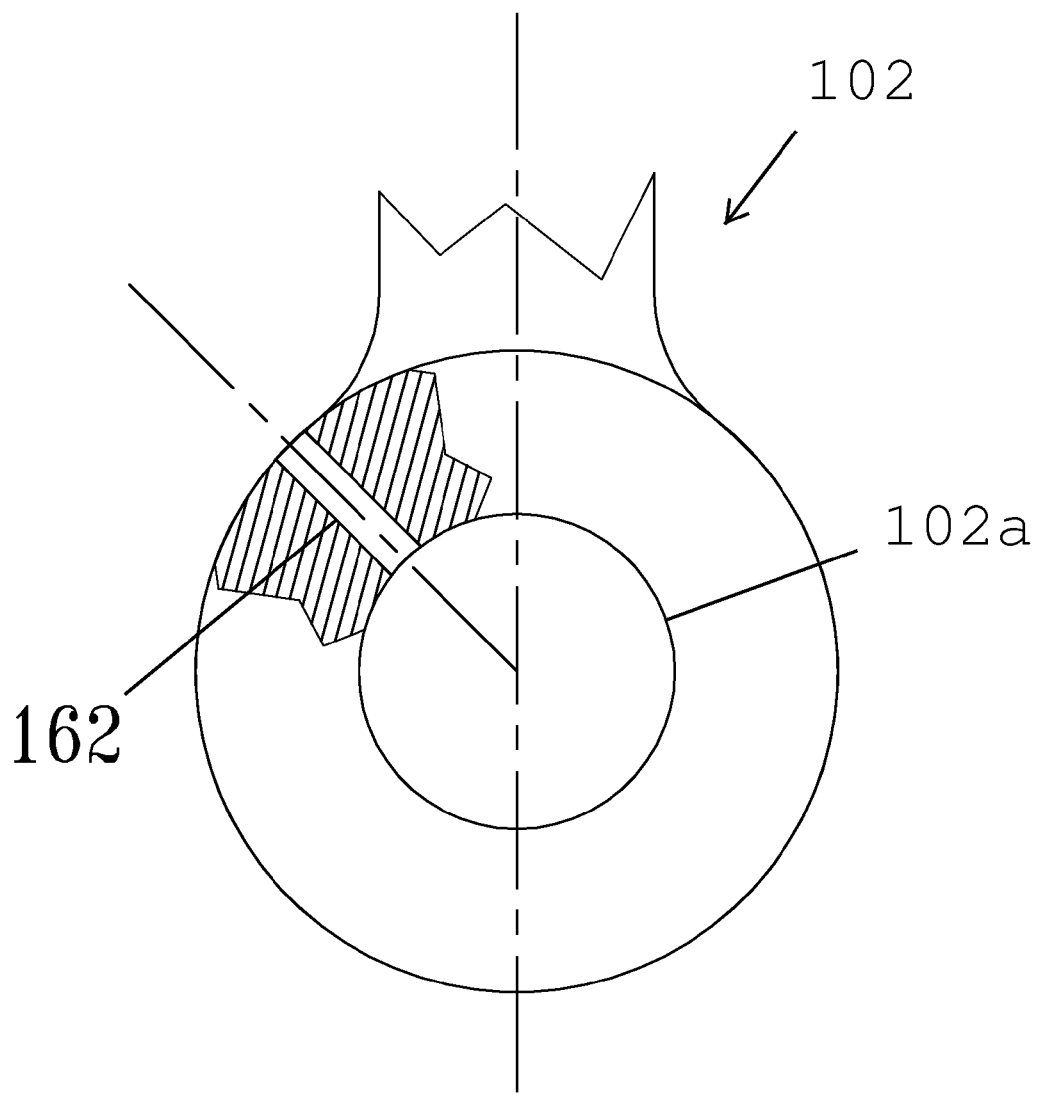
FIG. 9b depicts a side view of the lower end of an improved shackle apparatus arm and the retaining bore.
Figure 9C:
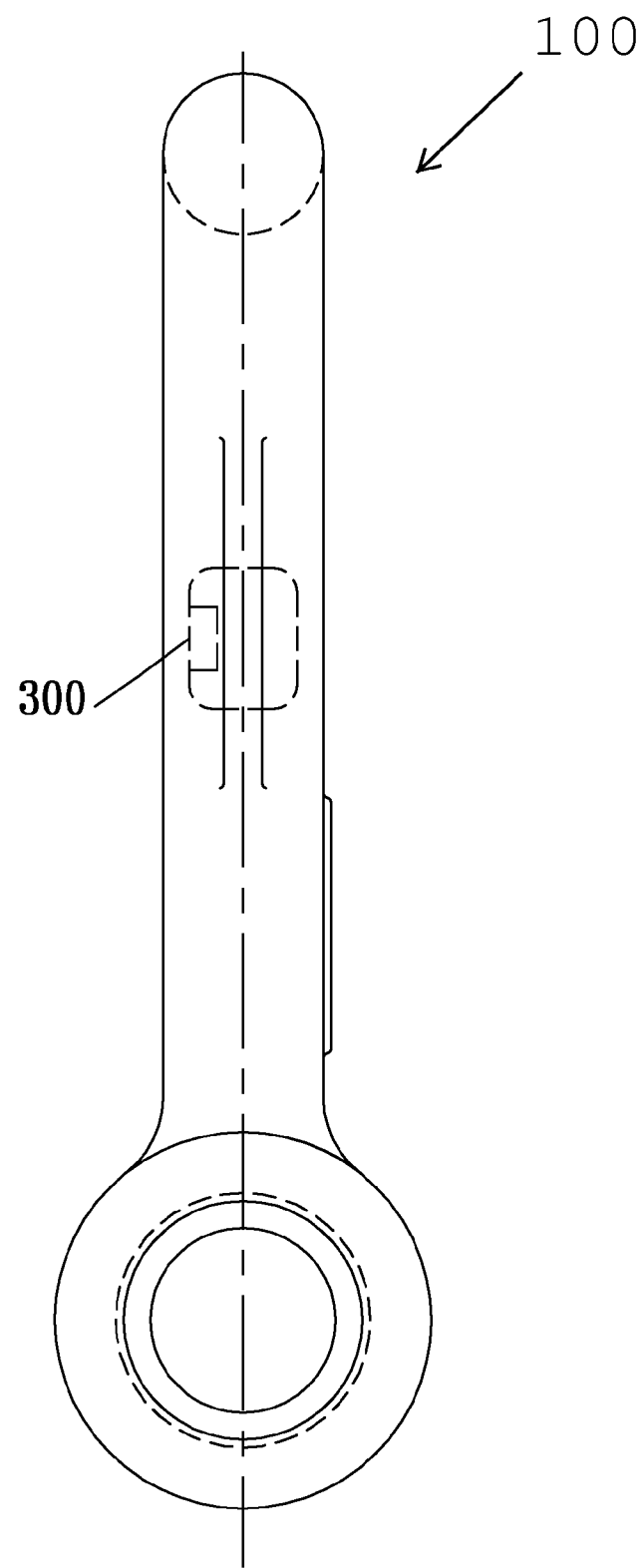
FIG. 9c depicts a side view of an improved shackle apparatus.
Figure 9D:
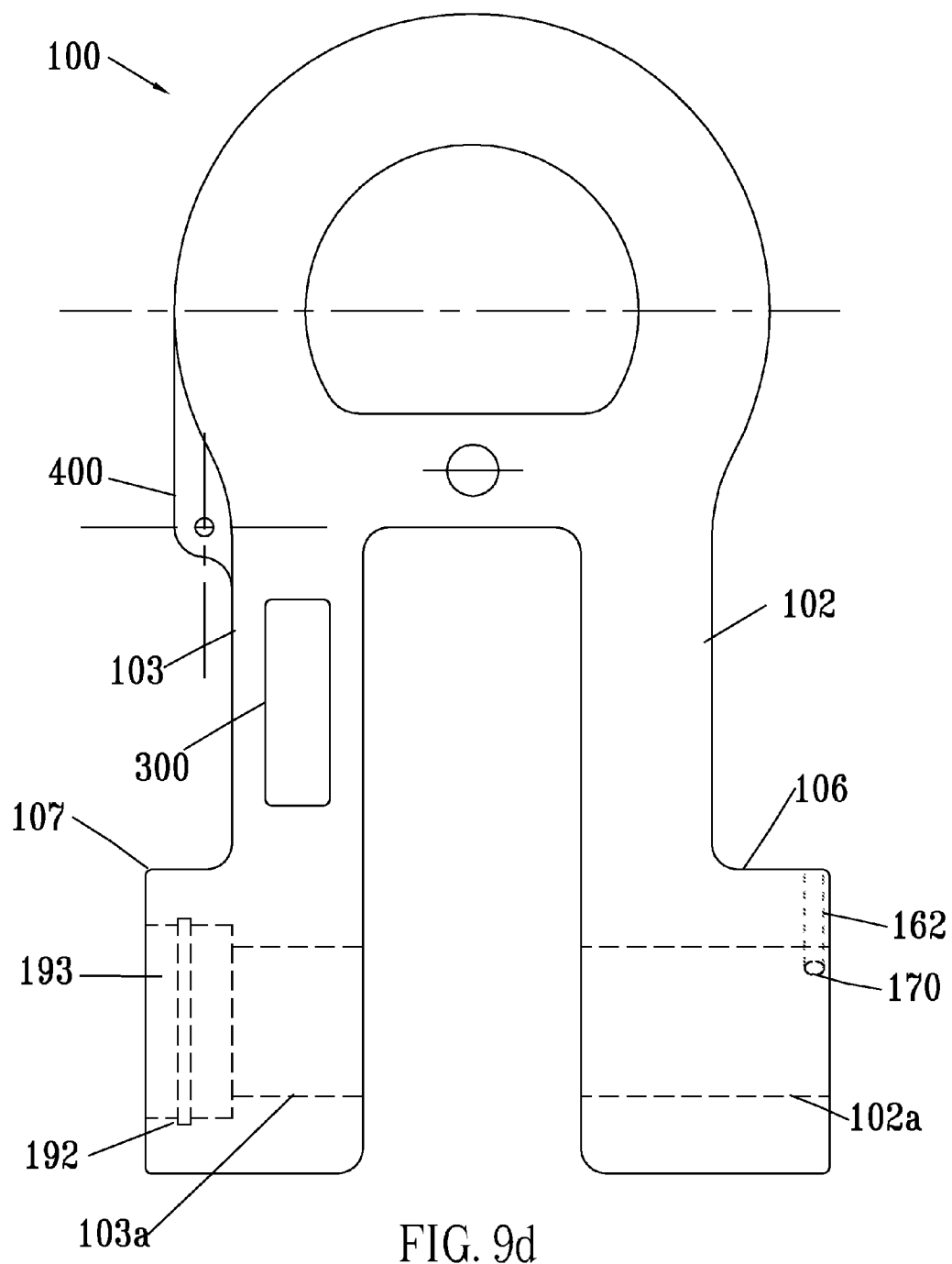
FIG. 9d depicts a view of an alternate embodiment of an improved shackle apparatus.

FIGS. 10a and 10b depict a bolt which may be used with the improved shackle apparatus shown in FIGS. 9a, 9d, and 12. FIG. 10a is a side view of bolt 120 and FIG. 10b is an end on view of bolt 120. The bolt 120 has a slide relief area 150, a mid-section, and a threaded section, 151. Slide relief area 150 is adjacent to the head of the bolt while threaded section 151 is located at the opposite end of the bolt from the head. The mid-section of the bolt is located between slide relief area 150 and threaded section 151. Slide relief area 150 has a smaller diameter than the mid-section of the body of bolt 120 so that the bolt is capable of spinning in the transverse bores even after engagement of the retaining means. Additionally, the mid-section of bolt 120 has a diameter sized so that when the bolt 120 is completely screwed into the shackle, the bolt 120 is freely rotatable within the transverse bores 102a and 103a. Once the bolt is inserted into transverse bores, a retention means such as an expansion pin 170, described below, engages bolt 120. Once slide relief area 150 is adjacent to retention means, retention means partially enters transverse bore 102a and thus resists bolt 120's removal from the shackle apparatus. The diameter of slide relief area 150 is such that the bolt is able to freely rotate 360 degrees while the bolt is completely screwed into the shackle and while the retention means is engaged. In one embodiment, the bolt is only hand-tightened. In another embodiment, the bolt is tightened through the use of tools and therefore may be tighter than hand-tight.

In yet another embodiment, bolt 120 has a groove 160 located along a portion of the body of bolt 120. Groove 160 extends lengthwise along only part of the mid-section of bolt 120. Groove 160 does not extend the entire length of the body of bolt 120. In one embodiment, groove 160 extends from slide relief area 150 and ends before reaching threaded section 151. In another embodiment, groove 160 extends from slide relief area 150 to threaded section 151. Groove 160 allows for a retention means, such as expansion pin 170, located in the retaining bore 162 of lower end 106, to engage bolt 120 and fit into groove 160. The retaining bore 162 is located in the shoulder of lower end 106 so that the bore intersects transverse bore 102a. In one embodiment, retaining bore 162 is substantially parallel to first arm 102. In a further embodiment, retaining bore 162 may be aligned so that it is not substantially parallel to first arm 102 but still intersects transverse bore 102a, as depicted in FIG. 9b. The expansion pin 170 is inserted into retaining bore 162 until it engages groove 160. In one embodiment, once expansion pin 170 is fully inserted into retaining bore 162, the expansion pin 170 is flush with the exterior of first arm 102, thus preventing removal of the expansion pin 170, as depicted in FIG. 9d. Once the expansion pin 170 engages groove 160, the bolt 120 thereafter resists removal from transverse bore 102a. The expansion pin 170 allows the bolt to be partially removed such that the space between shackle arms 102 and 103 is completely clear but part of bolt 120 remains in transverse bore 102a through the engagement of expansion pin 170 with groove 160, thereby providing resistance to the bolt 120 from being completely removed from the shackle once bolt 120 is fully inserted into the shackle.

In another embodiment, bolt 120 has a retaining pin hole 126 adjacent to threaded section 151 for receiving a retaining pin, such as a cotter pin or a safety pin, as depicted in FIG. 12, to further resist removal of bolt 120 from the shackle apparatus body. In one embodiment, bracket 400 is attached to second arm 103. Bracket 400 has a hole for receiving a retaining cable (not shown). Retaining cable is connected to the retaining pin and functions to keep the retaining pin with the shackle. Bracket 400 may be integrally formed with the shackle body or may be permanently attached to the shackle body by means known in the art, which include, but are not limited to, welding, adhesives, epoxy, and glue. While bolt 120 is depicted in FIG. 10a and FIG. 12 as having retaining pin hole 126, in an alternative embodiment, bolt 120 does not have a retaining pin hole and therefore in this alternative embodiment, bolt 120 ends at threaded section 151.

In another embodiment, retaining bore 162 extends from the top end of the shoulder area of lower end 106 and intersects transverse bore 102a, as depicted in FIG. 9d. In another embodiment, retaining bore 162 intersects transverse bore 102a, but does not extend completely through the shoulder area of lower end 106, as depicted in FIG. 9a, and therefore has no external opening in the shoulder area of lower end 106 and opens only to the interior of transverse bore 102a.

Retention means other than expansion pin 170 may be located in retaining bore 162, such as, a spring-loaded pin (not shown) or a rubber boot (not shown). In a further embodiment, a spring-loaded pin is the retention mechanism. The spring-loaded pin is biased such that the spring pushes the pin partially into transverse bore 102a. Once bolt 120 is inserted into transverse bore 102a, the spring loaded pin engages slide relief area 150. Once bolt 120 is inserted so that groove 160 or slide relief area 150 is located proximate to retaining bore 162, the spring pushes the pin such that the pin engages groove 160 or slide relief area 150, thereby providing resistance to bolt 120 from being completely removed from shackle apparatus 100. Slide relief area 150 allows bolt 120 to spin in the shackle apparatus body while the spring loaded pin operates to resist removal of bolt 120 from transverse bore 102a. Once groove 160 is aligned with the spring loaded pin, bolt 120 may be partially removed from transverse bore 102a; however the spring loaded pin resists the complete removal of bolt 120 from transverse bore 102a once bolt 120 is positioned such that the end of groove 160 contacts the spring loaded pin.

In another embodiment, the retention means is a rubber boot. In this embodiment, a rubber boot is inserted into retaining bore 162. Rubber boot is shaped such that it may be deformed and inserted into retaining bore 162. However, once the rubber boot is inserted through to transverse bore 102a, the rubber expands and provides a lip around retaining bore 162, such that the rubber boot provides resistance to removal from the external side of the shoulder of lower end 106. Once bolt 120 is inserted into transverse bore 102a, the rubber boot engages either groove 160 or slide relief area 150, thereby providing resistance to bolt 120 from being completely removed from shackle apparatus 100. Slide relief area 150 allows bolt 120 to spin in the shackle apparatus body while the rubber boot resists removal of bolt 120 from transverse bore 102a. Once groove 160 is aligned with the rubber boot, bolt 120 may be partially removed from transverse bore 102a; however the rubber boot resists the complete removal of bolt 120 from transverse bore 102a once bolt 120 is positioned such that the end of groove 160 contacts the rubber boot.

FIG. 11 shows a side view of a nut 180. Nut 180 has a threaded section and a countersunk section. The countersunk section has a smaller external diameter than the threaded section. The threaded section of nut 180 has interior threading for engaging the exterior threaded section 151 of bolt 120. The countersunk section of nut 180 may be sloped, as depicted in FIG. 11 and FIG. 12, such that the external diameter of the countersunk section decreases the farther away from the threaded section. However, in an alternate embodiment, the countersunk section of nut 180 has a substantially uniform external diameter. The internal diameter of the countersunk section is sized such that the mid-section of bolt 120 may be received into countersunk section of nut 180. The diameter of the threaded section of nut 180 and the size of the threads is sized such that there is a threaded engagement of bolt 120. In one embodiment, the retaining section of nut 180 is countersunk into the shoulder region of lower end 107. In one embodiment, nut 180 has a groove 190 extending around the entire circumference of the countersunk section and nut receiving section 193 of transverse bore 103a has a circumferential groove 192 of approximately the same width as groove 190. Snap ring 191 engages groove 190 and the circumferential groove 192 and operates to resist removal of nut 180 from the shackle once nut 180 is placed in the shackle. Circumferential groove 192 is located such that when nut 180 is threadably engaged with bolt 120, circumferential groove 192 is proximate to groove 190. In this embodiment, once the nut 180 and bolt 120 are placed in the shackle, the nut 180 resists removal from the shackle and the bolt 120 may be partially removed so that the entire space between shackle arms 102 and 103 is open, however, the bolt 120 resists removal from the transverse bore 102a through the retention means described above. Additionally, both nut 180 and bolt 120 may freely rotate 360 degrees within transverse bores 102a and 103a while remaining threadably engaged to each other. In another embodiment, nut 180 does not have groove 190.

Figure 13A:
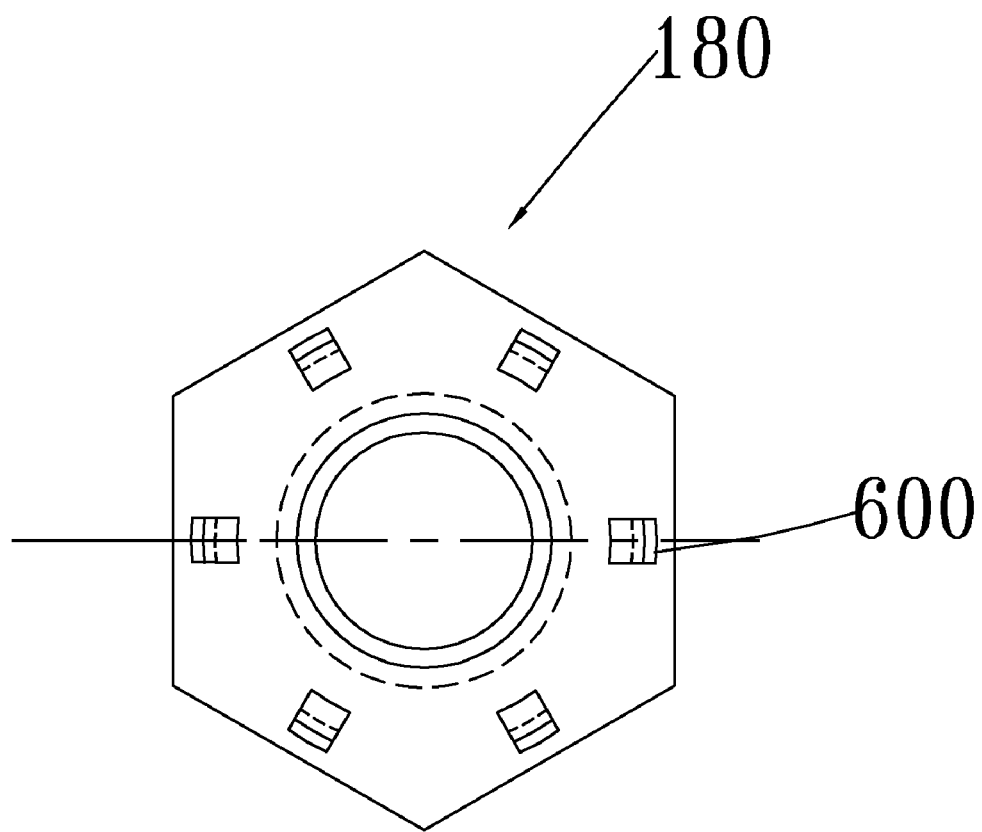
FIG. 13a depicts an end view of an alternate embodiment of a nut which may be used with an improved shackle apparatus.
Figure 13B:
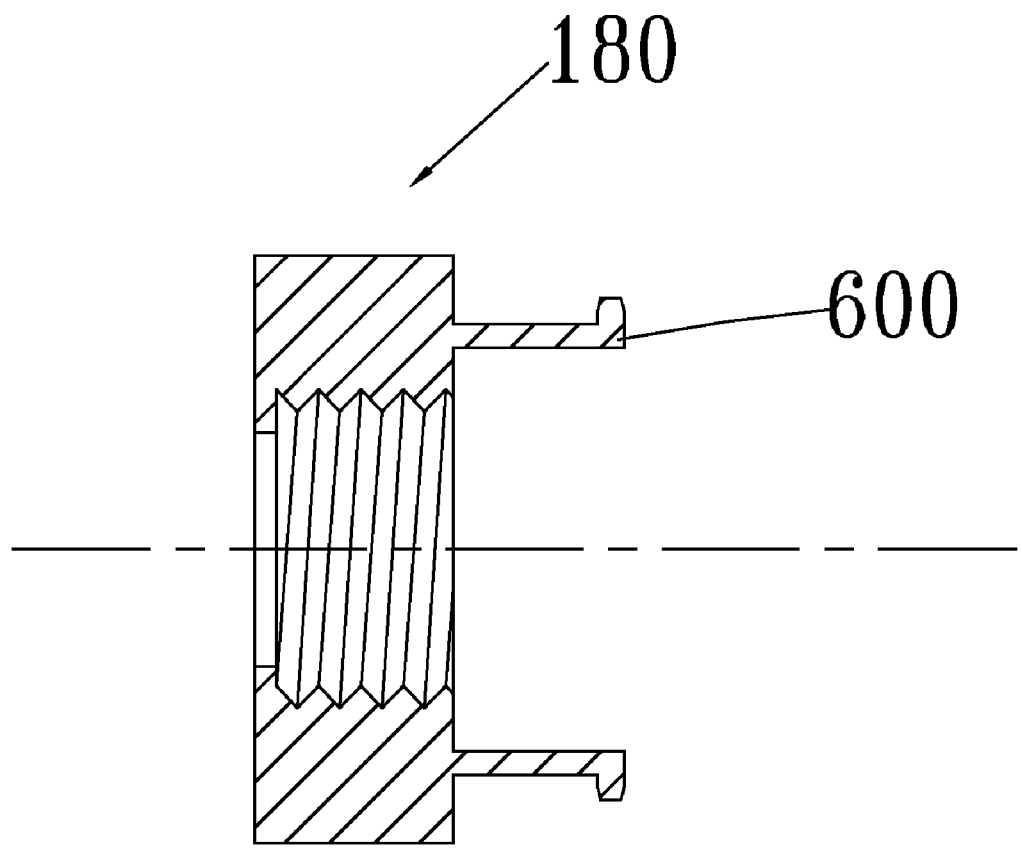
FIG. 13b depicts a side view of an alternative embodiment of a nut which may be used with an improved shackle apparatus.

In another embodiment, nut 180 does not have groove 190, but instead has tines 600, as depicted in FIG. 13a and FIG. 13b. Tines 600 are extend from the internal face of nut 180 and have external protrusions which engage circumferential groove 192 located in transverse bore 103a. Tines 600 are made from a material that is capable of deformation but will return to its original state, such that upon inserting nut 180 into transverse bore 103a, tines 160 are deformed inwards until they reach circumferential groove 192, where they then expand out to their original state. Materials with these properties are known in the art. The external protrusions from tines 600 engage the lip of circumferential groove 192 and thereby resist removal of nut 180 from transverse bore 103a while allowing nut 180 to freely spin 360 degrees within transverse bore 103a even when threadably engaged to bolt 120.

In yet a further embodiment, an RFID chip or tag (collectively referred to as "RFID tag") 300, is incorporated with the shackle apparatus and may be located on shackle arms 102 or 103 of shackle apparatus 100, as depicted in FIG. 9a and FIG. 9d. While FIG. 9a and FIG. 9d both depict RFID tag 300 as being located on arm 103, RFID tag 300 may be located on first arm 102. In another embodiment, RFID tag 300 may be located on the retaining member, as depicted in FIG. 9c. RFID tag 300 may be located in a recess in shackle apparatus 100. In another embodiment, RFID tag 300 is not located in a recess, but is attached to the body of the shackle. The means of attaching an RFID tag are disclosed above and include, but are not limited to, using an adhesive, resin, epoxy, or other material having desired properties.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A shackle apparatus comprising:
   a. an arcuate body;
   b. a first arm connected to said arcuate body, said first arm comprising:
      (i) a first lower end located at an opposite end of said first arm from said arcuate body, said first lower end comprising a first shoulder extending outwardly from said first arm;
      (ii) a first transverse bore extending through said first shoulder; and
      (iii) a retaining bore extending through at least a portion of said first shoulder and intersecting said first transverse bore;
   c. a second arm connected to said arcuate body, said second arm comprising:
      (i) a second lower end located at an opposite end of said second arm from said arcuate body, said second lower end comprising a second shoulder extending outwardly from said second arm;
      (ii) a second transverse bore extending through said second shoulder, said second transverse bore comprising a nut receiving section and an interior section, wherein said nut receiving section comprises a circumferential groove with a diameter greater than that of said nut receiving section, said nut receiving section being located in at least a portion of said second shoulder of said second arm and said nut receiving section having a diameter greater than that of said interior section;
   d. a retaining member disposed between said first and second arms, said retaining member integrally formed with said first and said second arms;
   e. a bolt received within said aligned first and second transverse bores, wherein said bolt comprises:
      (i) a head;
      (ii) a threaded portion located opposite of said head;
      (iii) a slide relief area adjacent to said head of said bolt, said slide relief area having a smaller diameter than the mid-section of said bolt and said first transverse bore;
      (iv) a mid-section of said bolt, connecting said first slide relief area to said threaded portion; and
      (v) a longitudinal groove extending from said first slide relief area along at least a portion of said mid-section of said bolt;
   f. a nut, which threadably engages said bolt in said nut receiving section of said second transverse bore in said second shoulder; and
   g. a retention means received within said retaining bore;

wherein said first and second arms are substantially parallel to each other, and said first and second transverse bores are in axial alignment.

2. The shackle apparatus of claim 1, wherein said nut is countersunk.

3. The shackle apparatus of claim 1, wherein said nut comprising at least one tine, wherein said tine engages said circumferential groove in said second transverse bore.

4. The shackle apparatus of claim 2, wherein said nut comprises a plurality of tines.

5. The shackle apparatus of claim 1, wherein said shackle apparatus further comprises an RFID chip.

6. The shackle apparatus of claim 1, wherein said retention means comprises a boot.

7. The shackle apparatus of claim 1, wherein said retention means comprises a spring-loaded pin.

8. The shackle apparatus of claim 1, wherein said retaining bore extends from said transverse bore through said first shoulder.

9. The shackle apparatus of claim 8, wherein said retention means comprises an expansion pin.

10. The shackle apparatus of claim 1, wherein said bolt further comprises a retaining pin hole located adjacent to said threaded portion of said bolt and at the opposite end of said bolt from said bolt head wherein a retaining pin removably engages said retaining pin hole.

11. A shackle apparatus comprising:
   a. an arcuate body;
   b. a first arm connected to said arcuate body, said first arm comprising:
      (i) a first lower end located at an opposite end of said first arm from said arcuate body, said first lower end comprising a first shoulder extending outwardly from said first arm; and
      (ii) a first transverse bore extending through said first shoulder;
   c. a second arm connected to said arcuate body, said second arm comprising:
      (i) a second lower end located at an opposite end of said second arm from said arcuate body, said second lower end comprising a second shoulder extending outwardly from said second arm; and
      (ii) a second transverse bore extending through said second shoulder, said second transverse bore comprising a nut receiving section and an interior section, wherein said nut receiving section comprises a circumferential groove with a diameter greater than that of said nut receiving section, said nut receiving section being located in at least a portion of said second shoulder of said second arm and said nut receiving section having a diameter greater than that of said interior section;
   d. a retaining member disposed between said first and second arms, said retaining member integrally formed with said first and said second arms;
   e. a bolt received within said aligned first and second transverse bores, wherein said bolt comprises:
      (i) a head;
      (ii) a threaded portion located opposite of said head;
      (iii) a slide relief area adjacent to said head of said bolt, said slide relief area having a smaller diameter than the mid-section of said bolt and said first transverse bore;
      (iv) a mid-section of said bolt, connecting said slide relief area to said threaded portion;
   f. a nut, which threadably engages said bolt in said nut receiving section of said second transverse bore, said nut comprising a circumferential groove in a countersunk region of said nut; and
   g. a snap-ring, said snap ring engaging said nut in said circumferential groove of said nut and said circumferential groove in said nut receiving section of said second transverse bore;

wherein said first and second arms are substantially parallel to each other, and said transverse bores are in axial alignment.

12. The shackle apparatus of claim 11, wherein said shackle apparatus further comprises an RFID chip.

13. The shackle apparatus of claim 11, wherein said bolt further comprises a retaining pin hole located adjacent to said threaded portion of said bold and at the opposite end of said bolt from said bolt head wherein a retaining pin removably engages said retaining pin hole.

14. A shackle apparatus comprising:
   a. an arcuate body;
   b. a first arm connected to said arcuate body, said first arm comprising:
      (i) a first lower end located at an opposite end of said first arm from said arcuate body, said first lower end comprising a first shoulder extending outwardly from said first arm;
      (ii) a first transverse bore extending through said first shoulder; and
      (iii) a retaining bore extending through at least a portion of said first shoulder and being substantially perpendicular to and intersecting said first transverse bore;
   c. a second arm connected to said arcuate body, said second arm comprising:
      (i) a second lower end located at an opposite end of said second arm from said arcuate body, said second lower end comprising a second shoulder extending outwardly from said second arm; and
      (ii) a second transverse bore extending through said second shoulder, said second transverse bore comprising a nut receiving section and an interior section, wherein said nut receiving section comprises a circumferential groove with a diameter greater than that of said nut receiving section, said nut receiving section being located in at least a portion of said second shoulder of said second arm and said nut receiving section having a diameter greater than that of said interior section;
   d. a retaining member disposed between said first and second arms, said retaining member integrally formed with said first and said second arms;
   e. a bolt received within said aligned first and second transverse bores, wherein said bolt comprises:
      (i) a head;
      (ii) a threaded portion located opposite of said head;
      (iii) a slide relief area adjacent to said head of said bolt, said slide relief area having a smaller diameter than the mid-section of said bolt and said first transverse bore;
      (iv) a mid-section of said bolt, connecting said slide relief area to said threaded portion; and
      (vi) a longitudinal groove extending from said slide relief area along at least a portion of said mid-section of said bolt;
   f. a nut, which threadably engages said bolt in said nut receiving section of said second transverse bore, said nut comprising a circumferential groove in a countersunk region of said nut;

g. a snap-ring, said snap ring engaging said nut in said circumferential groove of said nut and said circumferential groove in said nut receiving section of said second transverse bore; and h. a retention means received within said retaining bore; wherein said first and second arms are substantially parallel to each other, and said transverse bores are in axial alignment.

15. The shackle apparatus of claim 14, wherein said shackle apparatus further comprises an RFID chip.

16. The shackle apparatus of claim 14, wherein said retention means comprises a boot.

17. The shackle apparatus of claim 14, wherein said retention means comprises a spring-loaded pin.

18. The shackle apparatus of claim 14, wherein said retaining bore extends from said transverse bore through said first shoulder.

19. The shackle apparatus of claim 14, wherein said retention means comprises an expansion pin.

20. The shackle apparatus of claim 14, wherein said bolt further comprises a retaining pin hole located adjacent to said threaded portion of said bolt and at the opposite end of said bolt from said bolt head wherein a retaining pin removably engages said retaining pin hole.

* * * * *